United States Patent
Sun et al.

(10) Patent No.: US 7,768,886 B2
(45) Date of Patent: Aug. 3, 2010

(54) METHOD FOR DETECTING A UTILIZATION STATUS OF AN OPTICAL DISC AND APPARATUS THEREOF

(75) Inventors: Shang-Pin Sun, Hsin-Chu Hsien (TW); Fu-Shan Wang, Tai-Nan (TW)

(73) Assignee: Mediatek Inc., Science-Based Industrial Park, Hsin-Chu (TW)

(*) Notice: Subject to any disclaimer, the term of this patent is extended or adjusted under 35 U.S.C. 154(b) by 786 days.

(21) Appl. No.: 11/678,626

(22) Filed: Feb. 26, 2007

(65) Prior Publication Data
US 2008/0205206 A1    Aug. 28, 2008

(51) Int. Cl.
G11B 7/00    (2006.01)
(52) U.S. Cl. ............... 369/53.1; 369/53.17; 369/53.24
(58) Field of Classification Search ............... 369/47.27, 369/47.1, 53.13, 53.12, 124.01, 53.24, 53.32, 369/53.33, 53.34, 124.15, 53.1, 53.17
See application file for complete search history.

(56) References Cited

U.S. PATENT DOCUMENTS

| | | | |
|---|---|---|---|
| 5,363,358 A * | 11/1994 | Yanagawa | 369/44.29 |
| 6,366,549 B1 * | 4/2002 | Lee et al. | 369/112.05 |
| 6,728,180 B1 | 4/2004 | Park | |
| 6,922,381 B2 * | 7/2005 | Shidara | 369/44.32 |
| 7,652,962 B2 * | 1/2010 | Zhou et al. | 369/53.1 |
| 2004/0057365 A1 | 3/2004 | Chen | |
| 2007/0177474 A1 | 8/2007 | Chen | |

FOREIGN PATENT DOCUMENTS

CN    1490812 A    4/2004

* cited by examiner

*Primary Examiner*—Nabil Z Hindi
(74) *Attorney, Agent, or Firm*—Winston Hsu

(57) ABSTRACT

A method for detecting a utilization status of an optical disc is disclosed. The method includes: accessing the optical disc to generate a radio frequency signal; generating an estimated blank signal according to the radio frequency signal; generating a first reference signal to indicate a DC level of the radio frequency signal according to the radio frequency signal; and detecting a true overwrite area of the optical disc according to said blank signal and the first reference signal.

28 Claims, 5 Drawing Sheets

METHOD FOR DETECTING A UTILIZATION STATUS OF AN OPTICAL DISC AND APPARATUS THEREOF

BACKGROUND

The present invention relates to a method and apparatus thereof for detecting a utilization status of an optical disc, and more particularly, to a method and apparatus thereof for identifying a true overwrite area and a true blank area of an optical disc.

An optical disc drive can be used for recording and/or reproducing data onto and/or from the optical discs. The optical disc drive can emit a laser beam from a light source such as a laser diode onto the recording layer of an optical disc, detect the intensity of light reflected back from the optical disc, and convert the light signal into a radio frequency (RF) signal for further signal processing. The RF signal is used to identify which section of the optical disc has been recorded or occupied according to conventional detecting methods. In the conventional method, only AC component of the RF signal is used for detection purpose. According to RF AC component, the status of an optical disc can be divided into three distinct types: blank, data and overwrite.

The drawback of the conventional method is that, if sections of the optical disk have been overwritten, the blank detection quite easy mistakenly detected those sections as the blank area. As a result, it causes erroneously overwriting and eventually causes the whole disk can not be functioned properly. The examples, such as recordable digital versatile discs (DVD-R, DVD+R) and recordable compact discs (CD-R), would be quite often not detecting the correct the optical disc status according to traditional detecting method while performing the process of a next writable address (NWA) detection or the calibration of related servo signal. Thus, it is essential to provide a precision detection method for correctly determining that the position, where is pointed on by the optical pickup unit (OPU), has been previously recorded.

A traditional blank detection circuit provides blank flags by using mono-multi or other means to achieve the purpose. This kind of blank detection circuit, however, often identifies some of overwrite areas as blank areas. As a result, the overwrite area on the optical disc may be etched again by write pulses due to the misjudgement of the blank detection. Thus, the conventional blank detecting method has limited ability to indicate overwritten areas with reference to the RF AC signal only.

SUMMARY OF THE INVENTION

It is therefore one of the objectives of the present invention to provide a method and apparatus thereof to detect a true overwrite area of the optical disc and detect a true blank area of the optical disc, to solve the above-mentioned problem.

According to an exemplary embodiment of the claimed invention, a method for detecting a utilization status of an optical disc is disclosed. The method comprises: accessing the optical disc to generate a radio frequency signal; generating an estimated blank signal according to the radio frequency signal; generating a first reference signal to indicate a DC level of the radio frequency signal according to the radio frequency signal; and detecting a true overwrite area of the optical disc according to said blank signal and the first reference signal.

According to another exemplary embodiment of the claimed invention, an apparatus for detecting a utilization status of an optical disc is disclosed. The apparatus comprises an optical pickup unit (OPU), a radio frequency signal processing circuit, a blank detector, a signal generator, and an overwrite detecting circuit. The optical pickup unit is for accessing the optical disc. The radio frequency signal processing circuit is for generating a radio frequency signal according to an output received from the optical pickup unit. The blank detector is coupled to the radio frequency signal processing circuit, for generating an estimated blank signal according to the radio frequency signal. The signal generator is coupled to the radio frequency signal processing circuit, for generating a first reference signal to indicate a DC level of the radio frequency signal according to the radio frequency signal. The overwrite detecting circuit is coupled to the blank detector and the signal generator, for detecting a true overwrite area of the optical disc according to said blank signal and the first reference signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
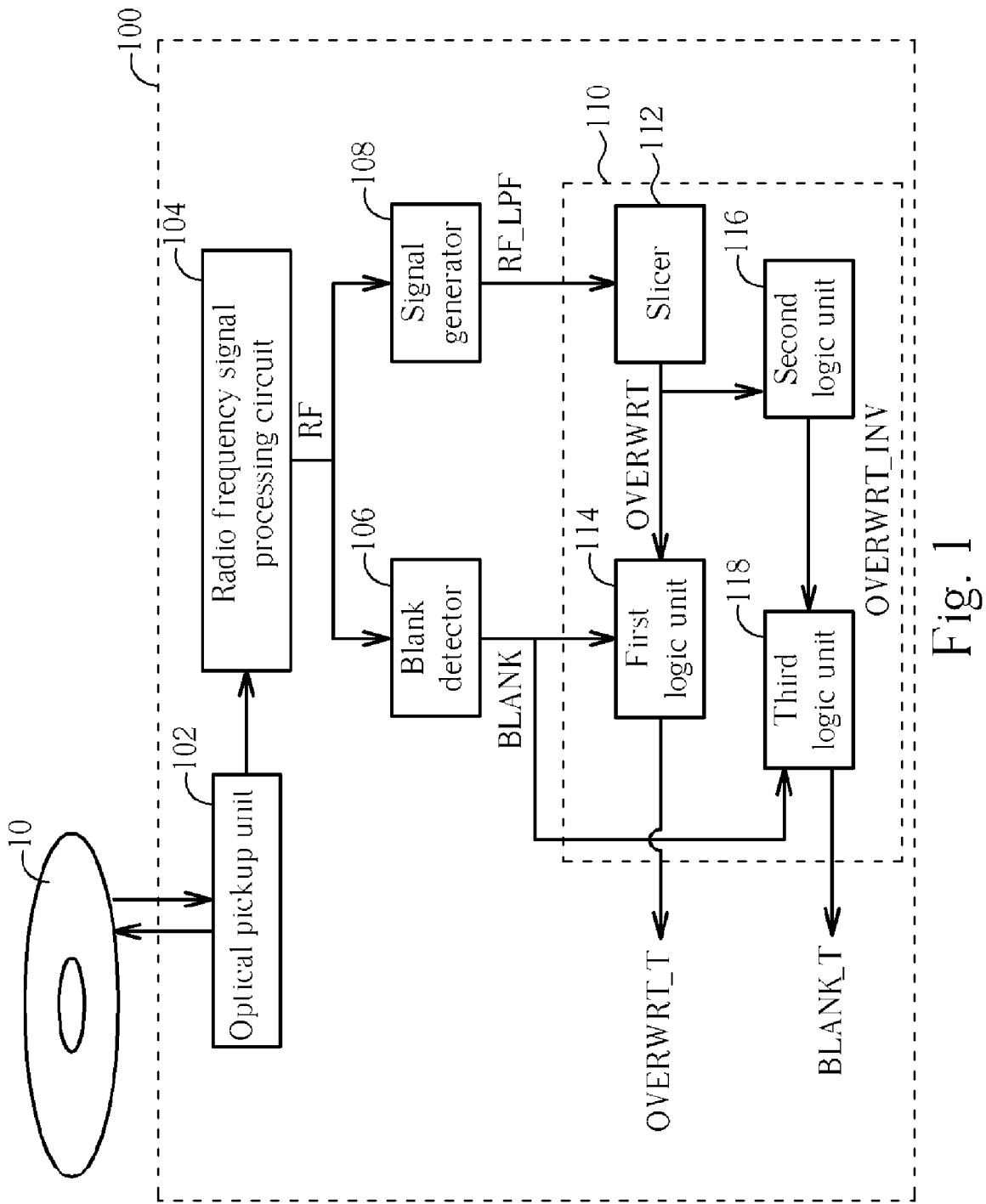
FIG. 1 is a block diagram illustrating an apparatus for detecting a utilization status of an optical disc according to a first embodiment of the present invention.

Please refer to FIG. 1. FIG. 1 is a block diagram illustrating an apparatus 100 for detecting a utilization status of an optical disc 10 according to the first embodiment of the present invention. As shown in FIG. 1, the apparatus 100 comprises an optical pickup unit (OPU) 102, a radio frequency signal processing circuit 104, a blank detector 106, a signal generator 108 (e.g. a low-pass filter), and an overwrite detecting circuit 110. In this embodiment, the apparatus 100 is integrated in an optical disc drive. The optical pickup unit 102 is implemented for accessing the optical disc 10, such as a recordable digital versatile disc. The radio frequency signal processing circuit 104 is implemented for generating a radio frequency signal RF according to an output received from the optical pickup unit 102. The blank detector 106 is coupled to the radio frequency signal processing circuit 104, and is implemented for generating an estimated blank signal BLANK according to the radio frequency signal RF. The signal generator 108 is coupled to the radio frequency signal processing circuit 104, and is implemented for generating a first reference signal RF_LPF to indicate a DC level of the radio frequency signal RF according to the radio frequency signal RF. The overwrite detecting circuit 110 is coupled to the blank detector 106 and the signal generator 108, and is implemented for detecting a true overwrite area of the optical disc 10 according to the estimated blank signal BLANK and the first reference signal RF_LPF.

Figure 2:
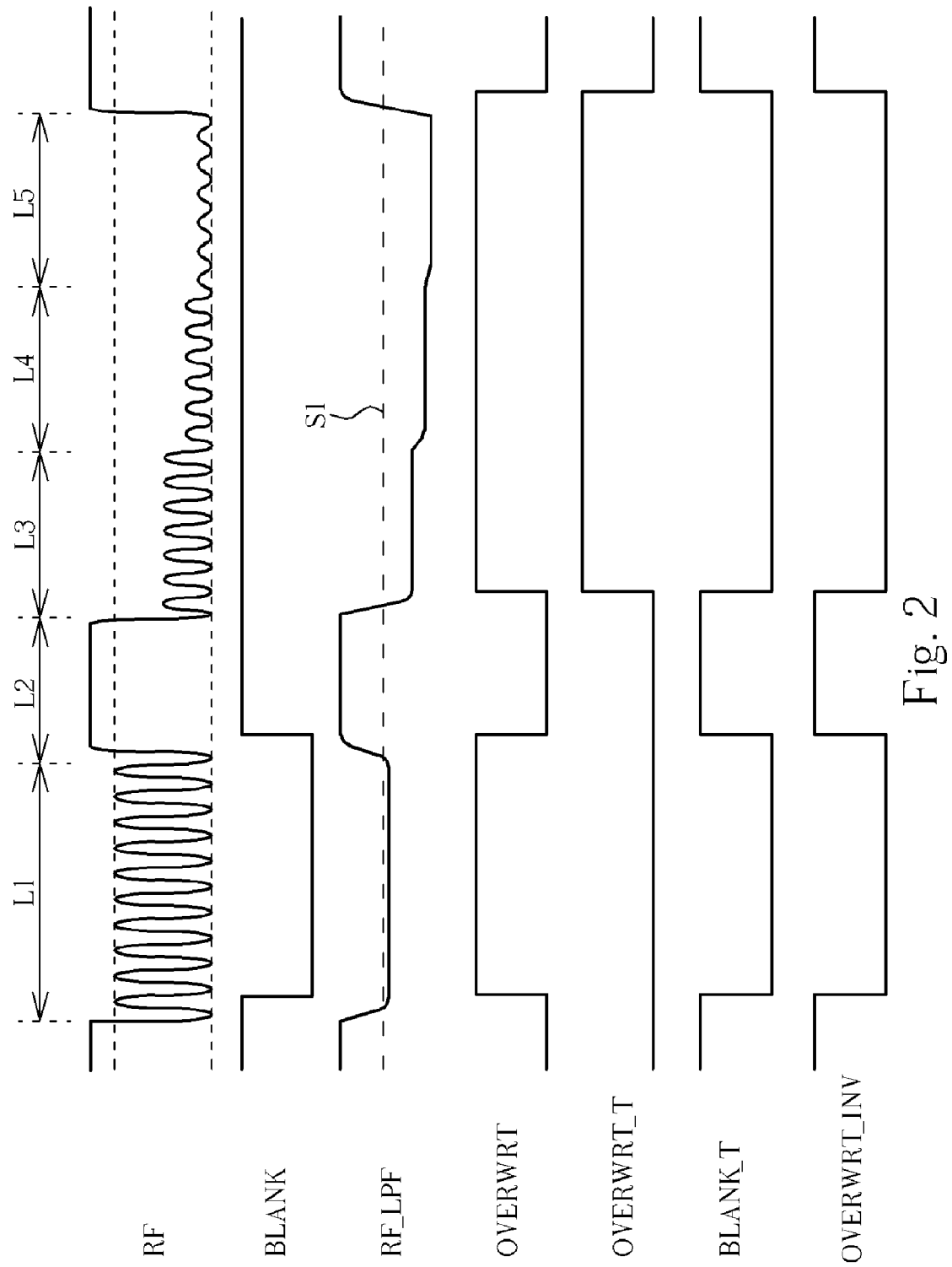
FIG. 2 is an exemplary timing diagram illustrating the relation among signals described in the first embodiment of the present invention.

As shown in FIG. 1, the overwrite detecting circuit 110 includes a slicer 112 coupled to the signal generator 108, and the first logic unit 114 coupled to the slicer 112 and the blank detector 106. Further description of the apparatus 100 for detecting the utilization status of the optical disc 10 is as below. Please refer to FIG. 2 and FIG. 1. FIG. 2 is an exemplary timing diagram illustrating the relation among signals described in the first embodiment of the present invention. Firstly, the optical pickup unit 102 emits a laser beam onto the recording layer of the optical disc 10, and receives a light signal reflected back from the recording layer of the optical disc 10. Then the radio frequency signal processing circuit 104 receives the reflected light signal from the optical pickup unit 102 to generate a radio frequency signal RF. Next, the blank detector 106 and the signal generator 108 will respectively generate an estimated blank signal BLANK and a first reference signal RF_LPF shown in FIG. 2 according to the radio frequency signal RF. Here, the signal generator 108 is implemented by a low-pass filter, however, this is not meant to be a limitation of the present invention. It should be noted that the estimated blank signal BLANK is a conventional blank signal. That is, the estimated blank signal BLANK is generated according to the conventional blank detection method. The first reference signal RF_LPF indicates the DC level of the radio frequency signal RF by low-pass filtering the radio frequency signal RF having oscillating amplitudes. As shown in FIG. 2, the radio frequency signal RF can be categorized into many signal sectors according to relative magnitudes. For example, the signal sector L1 corresponds to a disc area written once; the signal sector L2 corresponds to a blank area; the signal sector L3 corresponds to a disc area written twice; the signal sector L4 corresponds to a disc area written thrice; and the signal sector L5 corresponds to a disc area written many times. As can be seen, the radio frequency signal generated from accessing the blank area on the optical disc 10 will have greater magnitude.

Then, the overwrite detecting circuit 110 receives both estimated blank signal BLANK and first reference signal RF_LPF for further processing. The slicer 112 in the overwrite detecting circuit 110 will slice the first reference signal RF_LPF received from the signal generator 108 with a slicing level S1 to generate a second reference signal OVERWRT shown in FIG. 2. Referring to FIG. 2, if the voltage level of the first reference signal RF_LPF is higher than slicing level S1, the output voltage level of the second reference signal OVERWRT will be at a high voltage level; if not, the output voltage level of the second reference signal OVERWRT will be at low voltage level. Then the first logic unit 114 in the overwrite detecting circuit 110 performs an AND operation on estimated blank signal BLANK received from the signal generator 108 and the second reference signal OVERWRT received from the slicer 112 to generate a third reference signal OVERWRT_T. The third reference signal OVERWRT_T indicates the true overwrite area(s) of the optical disc 10. In other words, when the voltage level of the third reference signal OVERWRT_T is at a high level, it means that the utilization status of the optical disc 10 at that time is overwrite. Furthermore, the second logic circuit 116 in the overwrite detecting circuit 110 will receive the second reference signal OVERWRT from the slicer 112 and inverse the second reference signal OVERWRT to generate an inversed second reference signal OVERWRT_INV. Then the third logic circuit 118 in the overwrite detecting circuit 110 performs an AND operation on estimated blank signal BLANK received from the signal generator 108 and the inversed second reference signal OVERWRT_INV received from the second logic circuit 116 to generate a fourth reference signal BLANK_T. The fourth reference signal BLANK_T indicates true blank area(s) of the optical disc 10. In other words, when the voltage level of the fourth reference signal BLANK_T is at a high level, it means that the utilization status of the optical disc 10 at that time is blank.

Briefly summarized, the first reference signal RF_LPF is sliced with a fixed or adaptive slicing level S1 to generate the second reference signal OVERWRT since the signal level of signal RF_LPF will remain at a low voltage level when the optical pickup unit 102 is accessing the overwrite area on the optical disc 10. However, the second reference signal OVERWRT is further processed according to the estimated blank signal BLANK to generate the third reference signal OVERWRT_T for indicating true overwrite area(s) on the optical disc 10. Similarly, the estimated blank signal BLANK is also processed according to the second reference signal OVERWRT to generate the fourth reference signal BLANK_T for indicating true blank area(a) on the optical disc 10. In addition to the radio frequency signal RF, the blank detection scheme of above exemplary embodiment also refers to a reference signal extracted by low-pass filtering the radio frequency signal RF to distinguish true blank areas and true overwrite areas on the optical disc 10.

Figure 3:
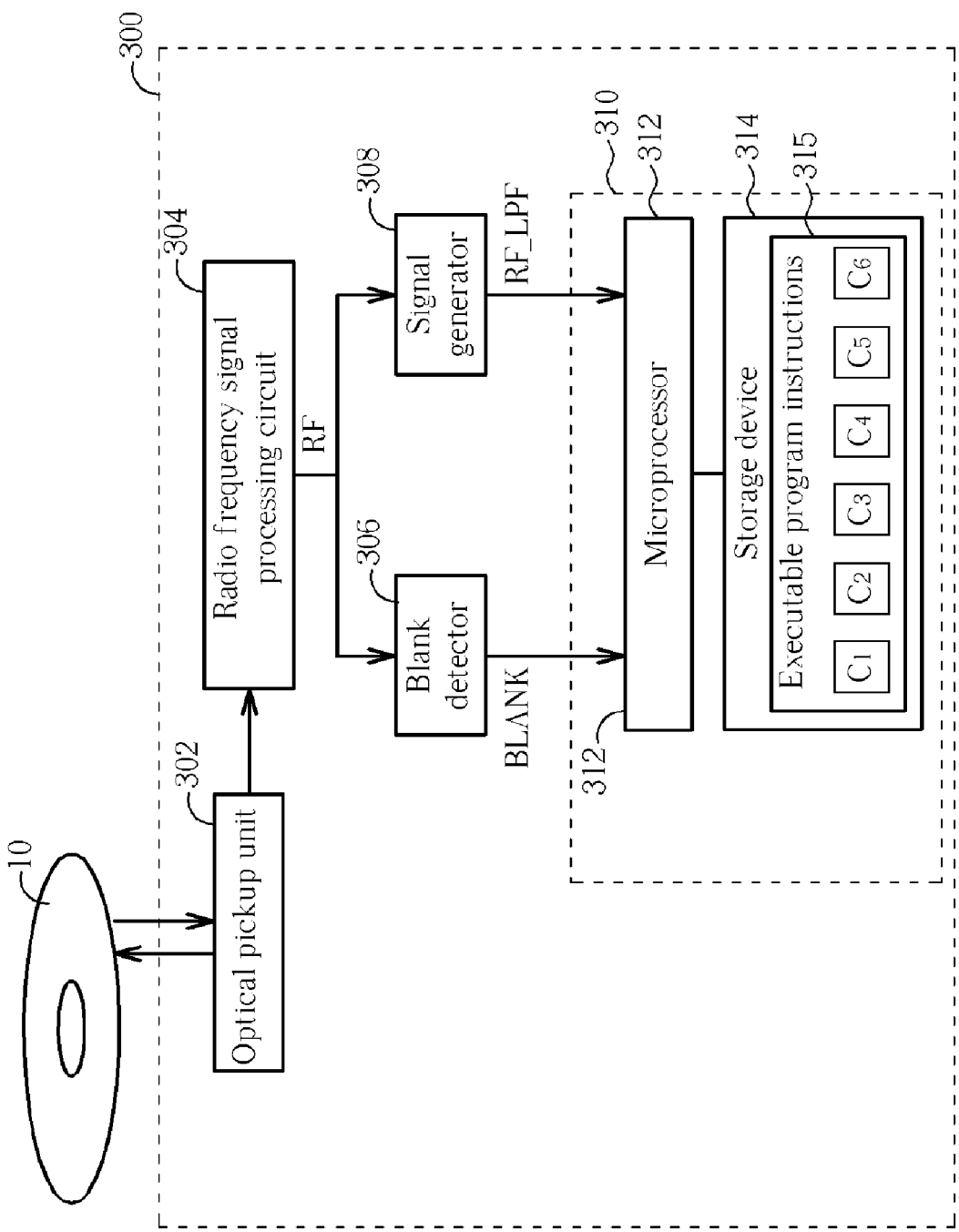
FIG. 3 is a block diagram illustrating an apparatus for detecting a utilization status of the optical disc according to a second embodiment of the present invention.

The above disclosure illustrates a hardware implementation of the blank detection. However, a software implementation of the blank detection is also possible. Please refer to FIG. 3. FIG. 3 is a block diagram illustrating an apparatus 300 for detecting a utilization status of the optical disc 10 according to a second embodiment of the present invention. In this embodiment, the apparatus 300 is integrated in an optical disc drive. As shown in FIG. 3, the apparatus 300 comprises an optical pickup unit (OPU) 302, a radio frequency signal processing circuit 304, a blank detector 306, a signal generator 308 (e.g. a low-pass filter), and an overwrite detecting circuit 310. The optical pickup unit 302 is implemented for accessing the optical disc 10, such as a recordable digital versatile disc. The radio frequency signal processing circuit 304 is implemented for generating a radio frequency signal RF according to an output received from the optical pickup unit 302. The blank detector 306 is coupled to the radio frequency signal processing circuit 304, and is implemented for generating an estimated blank signal BLANK according to the radio frequency signal RF. The signal generator 308 is coupled to the radio frequency signal processing circuit 304, and is implemented for generating a first reference signal RF_LPF to indicate a DC level of the radio frequency signal RF according to the radio frequency signal RF. The overwrite detecting circuit 310 is coupled to the blank detector 306 and the signal generator 308, and is implemented for detecting true overwrite area(s) of the optical disc 10 according to the blank signal BLANK and the first reference signal RF_LPF.

As shown in FIG. 3, the overwrite detecting circuit 310 includes a microprocessor 312 and a storage device 314. The storage device 314 is implemented for storing executable program instructions 315. The executable program instructions 315 comprise a plurality of program execution codes $C_1$, $C_2$, $C_3$, $C_4$, $C_5$ and $C_6$. Please note that this is for illustrative purposes only. The microprocessor 312 is coupled to the blank detector 306, the signal generator 308 and the storage device 314, and is implemented for executing the executable program instructions 315 stored in the storage device 314 to detect the true overwrite area(s) and true blank area(s) of the optical disc 10. Further description of the apparatus 300 for detecting the utilization status of the optical disc 10 is as below.

Firstly, the optical pickup unit 302 emits a laser beam onto the recording layer of the optical disc 10, and receives a light signal reflected back from the recording layer of the optical disc 10. Then the radio frequency signal processing circuit 304 receives the light signal from the optical pickup unit 302 to generate a radio frequency signal RF. Next, the blank detector 306 and the signal generator 308 will respectively generate an estimated blank signal BLANK and a first reference signal RF_LPF shown in FIG. 5 according to radio frequency signal RF. Here, the signal generator 308 is implemented by a low-pass filter. The estimated blank signal BLANK is a conventional blank signal. In other words, the estimated blank signal BLANK is generated according to the conventional blank detection method. The first reference signal RF_LPF indicates the DC level of the radio frequency signal RF. The overwrite detecting circuit 310 then receives both estimated blank signal BLANK and first reference signal RF_LPF for further processing.

Figure 4:
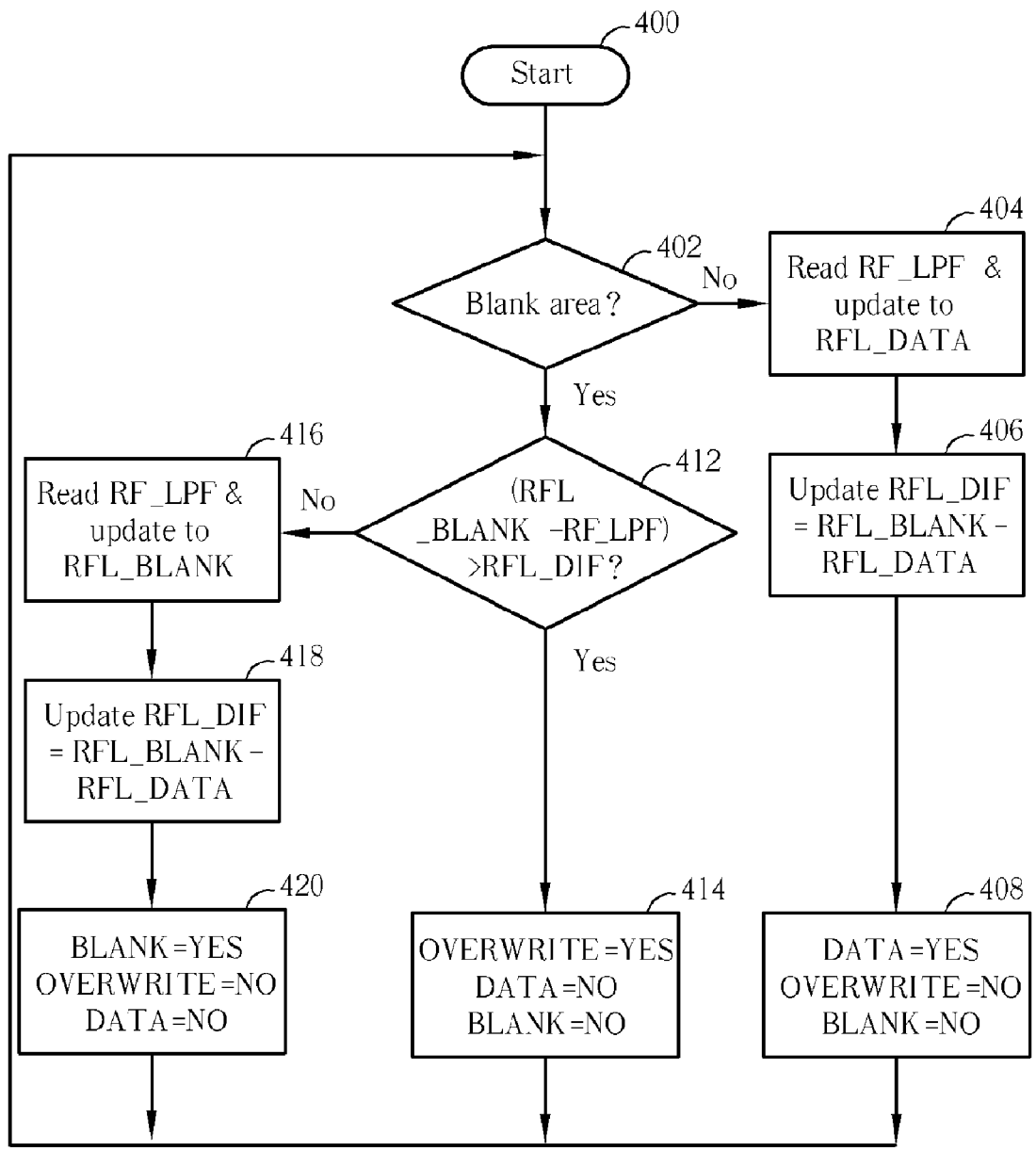
FIG. 4 is an exemplary flow chart illustrating operation of an overwrite detecting circuit shown in FIG. 3.
Figure 5:
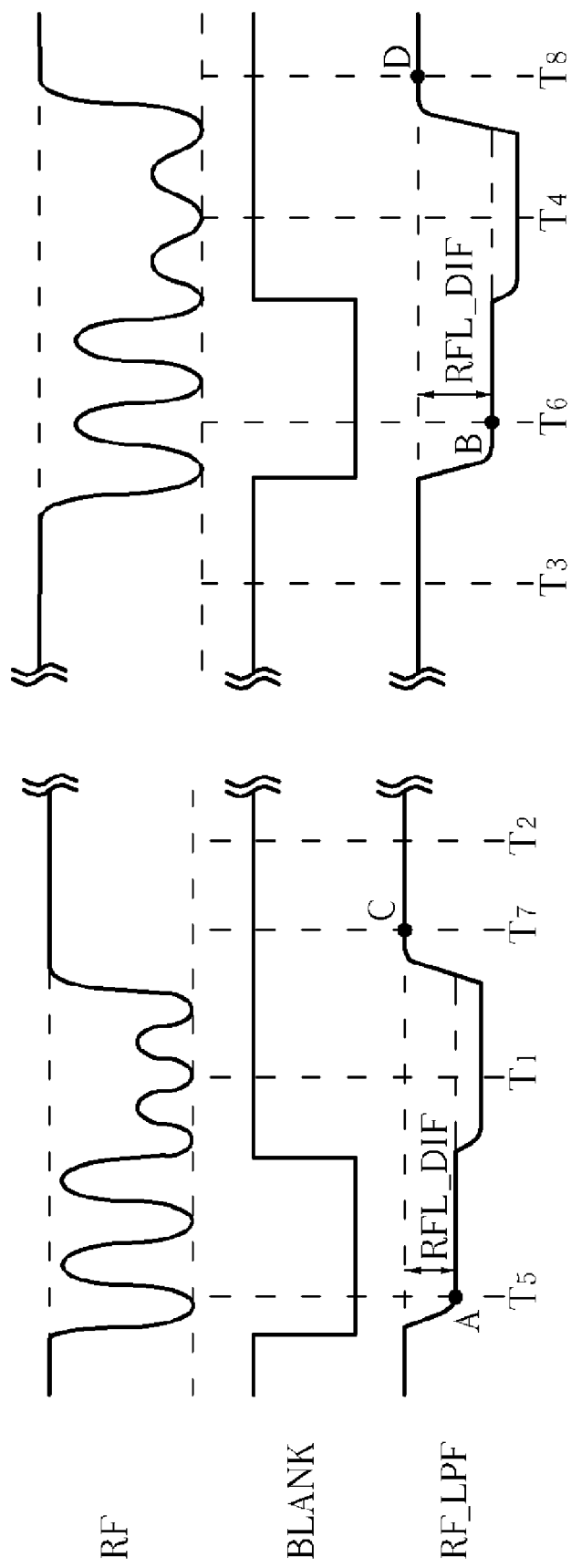
FIG. 5 is an exemplary timing diagram illustrating the relation among signals described in the second embodiment of the present invention.

Please refer to FIG. 4 and FIG. 5. FIG. 4 is an exemplary flow chart illustrating operation of the overwrite detecting circuit 310 shown in FIG. 3, and FIG. 5 is an exemplary timing diagram illustrating the relation among signals described in the second embodiment of the present invention. It should be noted that, if the result is substantially the same, the steps in FIG. 4 are not limited to be executed according to the exact order shown in the exemplary flow chart. The microprocessor 312 in the overwrite detecting circuit 310 will execute the program execution code $C_1$ of executable program instructions 315 stored in the storage device 314 for determining whether a first condition (the current position on the optical disc 10 belongs to the blank area) is met according to the estimated blank signal BLANK (step 402). If the first condition is met, microprocessor 312 further executes the program execution code $C_2$ of executable program instructions 315 for determining whether a second condition is met according to the first reference signal RF_LPF (step 412). The second condition is a decision rule checking whether a difference between a first voltage level RFL_BLANK and the first reference signal RF_LPF is greater than a reference value REL_DIF. In this embodiment, the reference value REL_DIF is defined to be a difference between the first voltage level RFL_BLANK and a second voltage level RFL_DATA. The first voltage level RFL_BLANK and second voltage level RFL_DATA are voltage levels of the first reference signal REL_DIF corresponding to the blank area and data area respectively. If the second condition is met, the microprocessor 312 identifies that the current position on the optical disc 10 belongs to the true overwrite area (step 414). For example, as shown in FIG. 5, the microprocessor 312 will identify that the current position on the optical disc 10 belongs to the true overwrite area at the timing $T_1$ and $T_4$. Furthermore, if the first condition is met and the second condition is not met, the microprocessor 312 identifies that the current position on the optical disc 10 belongs to the true blank area (steps 420). For example, as shown in FIG. 5, the microprocessor 312 will identify that the current position on the optical disc 10 belongs to the true blank area at the timing $T_2$ and $T_3$.

If the first condition is not met, the microprocessor 312 executes the program execution code $C_3$ of executable program instructions 315 to read a current voltage level of the first reference signal RF_LPF corresponding to the data area so as to update the second voltage level RFL_DATA, and then executes the program execution code $C_5$ of executable program instructions 315 to update the reference value REL_DIF by an updated second voltage level RFL_DATA and first voltage level RFL_BLANK (steps 404, 406). In other words, when the first condition is not met, this means that the optical pickup unit 302 is accessing the data area on the optical disc 10. Therefore, the second voltage level RFL_DATA is allowed to be updated accordingly. For example, as shown in FIG. 5, the second voltage level RFL_DATA is updated by the current voltage level A, B of the first reference signal RF_LPF at timings $T_5$ and $T_6$ respectively. On the other hand, if the first condition is met but the second condition is not met, the microprocessor 312 executes the program execution code $C_4$ of executable program instructions 315 to read a current voltage level of the first reference signal RF_LPF corresponding to the blank area so as to update the first voltage level RFL_BLANK, and then executes the program execution code $C_5$ of executable program instructions 315 to update the reference value REL_DIF by an updated first voltage level RFL_BLANK and second voltage level RFL_DATA (steps 416, 418). In other words, when the first condition is met but the second condition is not met, this means that the optical pickup unit 302 is accessing the true blank area on the optical disc 10. Therefore, the first voltage level RFL_BLANK is allowed to be updated accordingly. For example, as shown in FIG. 5, the first voltage level RFL_BLANK is updated by the current voltage levels C, D of the first reference signal RF_LPF at timings $T_7$ and $T_8$ respectively.

As mentioned above, the reference value REL_DIF is updated frequently, thereby improving the blank detection accuracy. That is, as known to those skilled in this art, the characteristic of the recording layer on the optical disc 10 is not uniform. When the optical pickup head 102 jumps from a current track to another track, the disclosed blank detection scheme will update the reference value REL_DIF after the track jumping is completed. Please note that the reference value REL_DIF is not limited to be the difference between the first voltage level RFL_BLANK and the second voltage level RFL_DATA. In other embodiments, the reference value REL_DIF could be defined according to the first voltage level RFL_BLANK, the second voltage level RFL_DATA and an offset value RFL_OFFSET, as below:

$$REL\_DIF = RFL\_BLANK - RFL\_DATA + RFL\_OFFSET \quad (1)$$

Furthermore, the offset value RFL_OFFSET could be determined according to the first reference signal RF_LPF and the second voltage level RFL_DATA (for example, REF_OFFSET=(RFL_DATA−RF_LPF)/2). Moreover, if both the first condition and the second condition are met, the microprocessor 312 executes the program execution code $C_6$ of executable program instructions 315 to update the offset value RFL_OFFSET according to the current voltage level of the first reference signal RF_LPF and the second voltage level RFL_DATA. For example, the flow chart shown in FIG. 4 can be modified to add a step between step 412 and step 414 to update the offset value RFL_OFFSET. Step 406 and step 418 can be modified to update the reference value REL_DIF according to the above equation (1).

In summary, the utilization status of the optical disc is determined by executing the program execution codes of executable program instructions. The program execution codes mainly include two decision rules. The first decision rule is for verifying if the current position on the optical disc belongs to a blank area according to the estimated blank signal BLANK, and the second decision rule is for verifying if the current position on the optical disc belongs to an overwrite area according to the first reference signal RF_LPF. If both of the two decision rules are met, the current position on the optical disc belonging to the overwrite area can be verified. On the other hand, if the first decision rule is met and the second decision rule is not met, the current position on the optical disc belonging to the blank area can be verified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a utilization status of an optical disc, the method comprising:
   accessing the optical disc to generate a radio frequency signal;
   generating an estimated blank signal according to the radio frequency signal;
   generating a first reference signal to indicate a DC level of the radio frequency signal according to the radio frequency signal; and
   detecting a true overwrite area of the optical disc according to said blank signal and the first reference signal.

2. The method of claim 1, wherein the step of detecting the overwrite area of the optical disc comprises:
   slicing the first reference signal with a fixed or adaptive slicing level to generate a second reference signal; and
   performing an AND operation on the estimated blank signal and the second reference signal to generate a third reference signal indicating the true overwrite area of the optical disc.

3. The method of claim 2, further comprising:
   inversing said second reference signal to generate an inversed second reference signal; and
   performing an AND operation on the estimated blank signal and the inversed second reference signal to generate a fourth reference signal indicating a true blank area of the optical disc.

4. The method of claim 1, further comprising:
   determining whether a first condition is met according to the estimated blank signal, wherein said first condition is a decision rule for verifying whether the current position on the optical disc belongs to the blank area; and
   determining whether a second condition is met according to the first reference signal, wherein said second condition is a decision rule for verifying whether the current position on the optical disc belongs to the overwrite area.

5. The method of claim 4, wherein the step of determining whether a second condition is met according to the first reference signal further comprises:
   checking whether a difference between the first reference signal and a first voltage level is greater than a reference value.

6. The method claim 5, wherein the first voltage level is a voltage level of the first reference signal corresponding to the blank area.

7. The method of claim 6, wherein the reference value is determined according to the first voltage level and a second voltage level, which is a voltage level of the first reference signal corresponding to a data area.

8. The method of claim 7, further comprising:
   if the first condition is met and the second condition is not met, updating the first voltage level by a current voltage level of the first reference signal corresponding to the blank area to generate an updated first voltage level, and updating the reference value according to the updated first voltage level and the second voltage level.

9. The method of claim 7, further comprising:
   if the first condition is not met, updating the second voltage level by a current voltage level of the first reference signal corresponding to the data area to generate an updated second voltage level, and updating the reference value according to the first voltage level and the updated second voltage level.

10. The method of claim 7, wherein the reference value is determined according to the first voltage level, the second voltage level, and an offset value.

11. The method of claim 9, further comprising:
    if both the first condition and the second condition are met, updating the offset value.

12. The method of claim 10, wherein the step of updating the offset value comprises:
    updating the offset value according to the first reference signal and the second voltage level.

13. The method of claim 4, wherein the step of detecting the overwrite area of the optical disc comprises:
    if both the first condition and the second condition are met, identifying that the current position on the optical disc belongs to the overwrite area of the optical disc.

14. The method of claim 4, further comprising:
    if the first condition is met and the second condition is not met, identifying that the current position on the optical disc belongs to the blank area of the optical disc.

15. An apparatus for detecting a utilization status of an optical disc, the apparatus comprising:
    an optical pickup unit (OPU), for accessing the optical disc;
    a radio frequency signal processing circuit, for generating a radio frequency signal according to an output received from the optical pickup unit; a blank detector, coupled to the radio frequency signal processing circuit, for generating an estimated blank signal according to the radio frequency signal;
    a signal generator, coupled to the radio frequency signal processing circuit, for generating a first reference signal to indicate a DC level of the radio frequency signal according to the radio frequency signal; and
    an overwrite detecting circuit, coupled to the blank detector and the signal generator, for detecting a true overwrite area of the optical disc according to said blank signal and the first reference signal.

16. The apparatus of claim 15, wherein the overwrite detecting circuit comprises:
    a slicer, for slicing the first reference signal with a fixed or adaptive slicing level to generate a second reference signal; and
    a first logic circuit, coupled to the slicer and the blank detector, for performing an AND operation on the estimated blank signal and the second reference signal to generate a third reference signal indicating the true overwrite area of the optical disc.

17. The apparatus of claim 16, further comprising:
    a second logic circuit, coupled to the slicer, for inversing said second reference signal to generate an inversed second reference signal; and a third logic circuit, coupled to the second logic circuit and the blank detector, for performing an AND operation on the estimated blank signal and the inversed second reference signal to generate a fourth reference signal indicating a true blank area of the optical disc.

18. The apparatus of claim 15, wherein the overwrite detecting circuit comprises:
a microprocessor; and
a storage device, storing executable program instructions executed by the microprocessor for detecting the true overwrite area of the optical disc according to the blank signal and the first reference signal, wherein the microprocessor further executes the executable program instructions for determining whether a first condition is met according to the estimated blank signal, wherein said first condition is a decision rule for verifying whether the current position on the optical disc belongs to the blank area, and for determining whether a second condition is met according to the first reference signal, wherein the second condition is a decision rule for verifying whether the current position on the optical disc belongs to the overwrite area.

19. The apparatus of claim 18, wherein the microprocessor further executes the executable program instructions to check whether a difference between the first reference signal and a first voltage level is greater than a reference value for verifying whether the current position on the optical disc belongs to the overwrite area.

20. The apparatus of claim 18, wherein the first voltage level is a voltage level of the first reference signal corresponding to the blank area.

21. The apparatus of claim 20, wherein the reference value is determined according to said first voltage level and a second voltage level, which is a voltage level of the first reference signal corresponding to a data area.

22. The apparatus of claim 21, wherein the microprocessor further executes the executable program instructions to update the first voltage level by a current voltage level of the first reference signal corresponding to the blank area to generate an updated first voltage level, and to update the reference value according to the updated first voltage level and the second voltage level if the first condition is met and the second condition is not met.

23. The apparatus of claim 21, wherein the microprocessor further executes the executable program instructions to update the second voltage level by a current voltage level of the first reference signal corresponding to the data area to generate an updated second voltage level, and to update the reference value according to the first voltage level and the updated second voltage level if the first condition is not met.

24. The apparatus of claim 21, wherein the reference value is determined according to the first voltage level, the second voltage level, and an offset value.

25. The apparatus of claim 24, wherein the microprocessor further executes the executable program instructions to update the offset value if both the first condition and the second condition are met.

26. The apparatus of claim 25, wherein the microprocessor executes the executable program instructions to update the offset value according to the first reference signal and the second voltage level.

27. The apparatus of claim 18, wherein the microprocessor executes the executable program instructions to identify that the current position on the optical disc belongs to the overwrite area of the optical disc if both the first condition and the second condition are met.

28. The apparatus of claim 18, wherein the microprocessor further executes the executable program instructions for identifying that the current position on the optical disc belongs to the blank area of the optical disc if the first condition is met and the second condition is not met.

* * * * *